United States Patent [19]

Haskell

[11] 3,914,518
[45] Oct. 21, 1975

[54] BARRIER COATED CELLULOSIC SUBSTRATES

[75] Inventor: Vernon Charles Haskell, Richmond, Va.

[73] Assignee: E. I. Du Pont de Nemours & Company, Wilmington, Del.

[22] Filed: May 22, 1974

[21] Appl. No.: 472,421

[52] U.S. Cl. ............... 428/451; 427/211; 427/324; 427/407; 428/453; 428/510
[51] Int. Cl.² ................. B32B 27/06; C01B 25/36
[58] Field of Search ............ 117/60, 68, 70 S, 76 F, 117/145, 144; 427/211, 324, 407; 428/451, 428/453, 510

[56] References Cited
UNITED STATES PATENTS

| | | | |
|---|---|---|---|
| 2,008,815 | 7/1935 | Brandenberger et al. | 428/453 |
| 2,087,013 | 7/1937 | Bateman | 428/448 |
| 2,394,009 | 2/1946 | Pollard | 427/207 |
| 2,658,843 | 11/1953 | Brillhart | 117/144 |
| 2,885,417 | 5/1959 | Heyden | 260/429.7 |
| 2,964,415 | 12/1960 | Payne et al. | 106/74 |
| 2,965,507 | 12/1960 | Lander | 106/80 |
| 3,011,910 | 12/1961 | Hagan et al. | 117/76 X |
| 3,073,733 | 1/1963 | Mitchell | 428/212 |
| 3,085,901 | 4/1963 | Lindsey et al. | 427/365 |
| 3,180,746 | 4/1965 | Patton et al. | 106/74 |
| 3,180,747 | 4/1965 | Patton et al. | 106/74 |
| 3,392,039 | 7/1968 | Cuneo | 106/84 |
| 3,470,013 | 9/1969 | Wagner | 117/70 |
| 3,716,511 | 2/1973 | Haskell | 260/29.6 RB |
| 3,821,014 | 6/1974 | Haskell et al. | 117/68 X |

FOREIGN PATENTS OR APPLICATIONS 473,513   10/1937   United Kingdom

*Primary Examiner*—Michael R. Lusignan

[57] ABSTRACT

Water-sensitive cellulosic substrates coated on at least one surface with a barrier coating (e.g., vinylidene chloride copolymer or aluminum or iron orthophosphate) applied from an organic solvent wherein the substrate surface is first impregnated with about 0.15 to 1.5 g./m.² of an alkali metal silicate (e.g., $Na_2SiO_3$ or $Li_2SiO_3$) wherein the mole ratio of $SiO_2$ to alkali metal oxide is from about 1.6 to 4.6. A preferred coated substrate may be represented by the following sequence of layers:

vinylidene chloride copolymer coating
orthophosphate layer
alkali metal silicate coating
cellophane substrate
alkali metal silicate coating
orthophosphate layer
vinylidene chloride copolymer coating

19 Claims, No Drawings

BARRIER COATED CELLULOSIC SUBSTRATES

BACKGROUND OF THE INVENTION

This invention relates to moisture and oxygen barrier coatings on water-sensitive cellulosic substrates and, more particularly, to such substrates wherein the barrier coatings are aluminum orthophosphates or iron orthophosphates.

The preparation of a durable barrier coating on a water-sensitive cellulosic substrate, i.e., cellophane, has presented some problems. This has been especially true when the barrier coating is applied from an organic solvent solution of aluminum or iron orthophosphate. One problem has been in achieving proper anchorage of the coating with retention of adequate barrier properties. In addition, the amount of solvent retention has been undesirably high. Also, selective penetration of one of the inorganic components may alter the composition of the remaining coating to the detriment of barrier properties. This invention provides cellophane films which are very useful for packaging goods to provide better protection against moisture and oxygen at high humidity.

SUMMARY OF THE INVENTION

It has been found that improvements can be made in the coating of at least one surface of a water-sensitive cellulosic substrate with a barrier coating applied from an organic solvent by first impregnating said surface with about 0.15 to 1.5 grams per square meter (g./m.$^2$) of an alkali metal silicate (e.g., $Na_2SiO_3$ or $Li_2SiO_3$) wherein the mole ratio of silicon dioxide to alkali metal oxide is from about 1.6 to 4.6.

DETAILED DESCRIPTION OF THE INVENTION

The cellophane is prepared from gel-regenerated cellulose in a normal manner as, for example, set forth in Haskell, U.S. Pat. No. 3,716,511, and Mitchell, U.S. Pat. No. 3,073,733. The latter describes a particularly useful substrate which provides greater strength and resistance to brittleness, particularly important in this application as discussed below.

In the final stages of preparation, the film is softened in the usual way, i.e., by multiple dips into the solution containing the softener, followed by removal of excess softener solution from the surfaces of the film using scrapers or nip rolls. But the softener solution, which usually contains an anchorage resin (e.g., a melamine formaldehyde-type resin such as "Accobond 3524"), is made up instead to contain the softener and alkali silicate of the desired mole ratio of silica to alkali oxide, without anchorage resin. The film then passes between the metal blade scrapers or nip rolls and then into the drying section of the casting machine.

An alternate process is to skip the softener tank of the casting machine and wind the wet film into rolls without drying. The film is then slit to appropriate widths and transported to another machine called an impregnator. The impregnator provides for unwinding the wet film, dipping it continuously into a softener solution containing the alkali silicate, drying the film on a series of heated drums, and winding the dry film into rolls for further processing.

Representative softeners are glycerol, propylene glycol, polyethylene glycol, urea, and mixtures of these. It is particularly preferred that the softener content range between about 5 and 12% of the total weight of the cellophane. The optimum softener concentration in the substrate film results from a compromise between the best barrier properties, which are favored by low softener content, and the least brittleness, which is favored by high softener content.

In accordance with this invention, it is preferred that the ratio of silicon oxide to alkali metal dioxide, e.g., lithium or sodium oxide, be from about 1.6 to 4.6. Use of mole ratios below about 1.6 may result in some discoloration of the cellophane. Use of mole ratios above about 4.6 may cause some deterioration in the barrier properties. The preferred ratio of silicon oxide to alkali metal dioxide is about 2.5 to 4. The preferred coating weight is from about 0.3 to 1 gram per square meter. It should be pointed out that the alkali metal silicate, although spoken of herein as a "coating," is actually an impregnant with the concentration of silicate being greater near the surface of the film. When the film is impregnated with alkali silicate, it prevents the barrier coating from making any substantial impregnation of this film.

The barrier coating applied from an organic solvent can be either a vinylidene chloride copolymer (frequently referred to as saran or "K" coating) or it can be an aluminum or iron orthophosphate barrier coating (which may be referred to as a phosphate coating). Suitable metal orthophosphate coatings include aluminum orthophosphates and ferric orthophosphates wherein the atom ratio of the metal to phosphorus is from about 2.3 to 0.5. It is also possible that up to about 50% of the aluminum or iron may be replaced by tin, titanium or zirconium. More information about these and other modifications thereof are incorporated herein by reference to assignee's applications of Haskell & Hecht, Ser. No. 273,301, filed July 19, 1972; Ser. No. 316,271, filed Dec. 18, 1972; Ser. No. 320,752, filed Jan. 3, 1973; and Ser. No. 330,389, filed Feb. 7, 1973. In the case where phosphate coatings are used, the organic solvent is preferably a lower-alkyl alcohol, i.e., about four carbon atoms or less, such as ethanol.

The vinylidene chloride copolymer is preferably one that has at least 88% vinylidene chloride monomer units. It is also preferred that the copolymer have less than about 5% of its units of copolymerized aliphatic carboxylic acid such as itaconic acid or the like. Particularly preferred are interpolymers of vinylidene chloride, acrylonitrile, ethyl methacrylate and itaconic acid. Specific copolymers suitable are copolymers of about 5.7% acrylonitrile, 3.6% ethyl acrylate, 0.3% itaconic acid, with the remainder being vinylidene chloride; and a copolymer of about 4.0% acrylonitrile, 5.3% methyl methacrylate, 0.3% itaconic acid, with the remainder being vinylidene chloride. Vinylidene chloride copolymers containing 2 to 30% by weight of a polymeric epoxy resin are also preferred. The teachings of assignee's application of Haskell & Hecht, Ser. No. 367,343, filed June 5, 1973, are specifically incorporated herein by reference.

The invention will now be described in connection with the following examples of specific embodiments thereof wherein parts and percentages are by weight unless otherwise specified. In connection with those examples, water vapor permeability (IPV) is measured in units of grams/100 m.$^2$/hour by a cup method wherein water is placed in a cup and covered with the test film and placed in an oven at 39.5°C. and 91% or 100% relative humidity and the weight loss is measured over 24 hours. Oxygen permeability (OPV) is measured on an "Oxtran 100" apparatus (commercially available from Modern Controls, Inc.) in terms of cc.'s/100 sq. in./24 hours at 1 atmosphere differential pressure.

EXAMPLE 1

A gel cellophane film is impregnated with sodium silicate having a ratio of $SiO_2$ to $Na_2O$ of about 3.25 by coating the film with a dispersion of 646 g. sodium silicate, 600 g. propylene glycol softener, and 2754 cc. of water at a film speed of about 35 feet per minute. The amount of silicate impregnated is roughly about 0.6 g./m.$^2$.

The dried, impregnated film is then coated with an aluminum orthophosphate dispersion made up of

| | | |
|---|---|---|
| 45.9 g. | "Chlorhydrol" | (a 50% aluminum chlorhydroxide solution available from Armour & Co.) |
| 1100 cc. | ethanol | |
| 75.1 g. | phosphoric acid | |
| 1100 cc. | ethanol | |

The Chlorhydrol is dissolved in 1,100 cc. of ethyl alcohol and the phosphoric acid is dissolved in another equal portion of ethanol. The acid solution is poured into the Chlorhydrol solution with vigorous agitation.

The phosphate coating is then applied to the impregnated base sheets in an 11-inch solvent coating tower set as follows:

| | |
|---|---|
| Doctor roll setting | 0.002 inch |
| Dip tank temperature | ambient |
| Tower temp. inlet | 156°C. |
| Tower temp. outlet | 98°C. |
| Tower air flow inlet | 0.4 CFM |
| Tower air flow outlet | 0.1 CFM |
| Film speed | 80 ft./min. |

After the phosphate coating has been applied and dried, the film is then top coated with a coating of a vinylidene chloride ($VCl_2$) copolymer of about 90.7% $VCl_2$, 4% acrylonitrile, 5% methyl methacrylate, 0.3% itaconic acid.

The polymer is mixed for coating as follows:

| | |
|---|---|
| 466.5 g. | $VCl_2$ copolymer |
| 780 cc. | toluene |
| 1328 cc. | tetrahydrofuran (THF) |
| 52 cc. | n-butyl acetate |
| 2.4 g. | "Vitel PE-100" (a low mol. wt. ethylene glycol polyester of terephthalic and isophthalic acids) |
| 200 cc. | THF (to dissolve "Vitel") |
| 14.6 g. | "Sunoco 4412" paraffin wax |
| 3 g. | Mistron Vapor HGO-55 clay |
| 80 cc. | toluene |

The toluene and vinylidene chloride copolymer are slurried for 30 minutes at 25°C. The THF is then added and the temperature is raised to 40°–45°C. during which time the acetate and the polyester are added. The wax, clay and 80 cc. toluene are prepared separately at 65°C. and then added and agitated for about 30 minutes at 40° to 45°C.

The coating is applied to the phosphate-coated films using the 11-inch solvent coating tower set as follows:

| | |
|---|---|
| Doctor roll setting | 0.003 inch |
| Tower temp. (inlet) | 130°C. |
| Tower air (inlet) | 0.4 CFM |
| Tower air (outlet) | 0.1 CFM |
| Dip tank temp. | 40°C. |
| Film speed | 80 ft./min. |

After drying the film, various tests are run typically indicating the following:

| | |
|---|---|
| OPV | <0.02 |
| IPV (91% cup) | 0 |
| IPV (100% cup) | 0 |
| IPV (Honeywell W825 MVT Tester) | 2.74 (average) |
| Residual ethanol | 35 ppm. |
| Residual THF | 0 |
| Residual toluene | 300 ppm. |
| Residual water | 1.9% |
| Residual softener | 8.4% |

The average strengths (in units of grams per inch of width) of heat seals applied at 140°C. and 5 psi. for ½ second are measured at 81% relative humidity for different time periods and temperatures as follows:

| | |
|---|---|
| "as is" | 246–300 |
| 18 hours at 100°F. | 120 |
| 24 hours at 100°F. | 122.5 |
| 48 hours at 100°F. | 96 |
| 114 hours at 100°F. | 37.5 |

These results typically show a significant improvement over films prepared as in this example wherein the cellophane is not impregnated with sodium silicate.

EXAMPLE 2

This example shows the use of lithium silicate as an impregnant. Solutions (a), (b) and (c) are made up, plus control sample (d) for comparison.

| | (a) | (b) | (c) | (d) |
|---|---|---|---|---|
| 20% lithium polysilicate (48) | 600 g. | 600 g. | 600 g. | none |
| $LiOH.H_2O$ | 3 g. | 7.2 g. | 32 g. | none |
| Water | 1614 ml. | 1694 ml. | 2194 ml. | none |
| $SiO_2/LiO_2$ ratio | 4.4 | 3.9 | 2.5 | — |
| Glycerol* | 222 g. | 230 g. | 283 g. | 10% in $H_2O$ |

*Added only after above ingredients are added and solutions are heated at 70°C. for 70 minutes and cooled.

These solutions are separately applied to samples of gel cellophane on an impregnator at a speed of 30 ft./min.

A solution of aluminum orthophosphate is prepared from 81.6 g. Chlorhydrol, 48.6 g. $H_3PO_4$, and sufficient ethanol to dilute to 1,200 ml.

Also prepared is a coating bath of the vinylidene chloride copolymer of Example 1 with epoxy resin (Shell "Epon 1001"), and paraffin wax as follows:

| | |
|---|---|
| $VCl_2$ copolymer | 240 grams |
| epoxy resin | 60 grams |
| kaolin clay | 2 grams |
| paraffin wax | 6 grams |
| toluene | 600 ml. |
| THF | 1100 ml. |

Samples are coated with vinylidene chloride copolymer coating only. Typical results are as follows:

|  | (a) | (b) | (c) | (d) |
|---|---|---|---|---|
| glycerine (%) | 6.3 | 6.0 | 6.7 | 5.6 |
| K coating thickness (mils) | 2.8 | 2.8 | 2.6 | 2.8 |
| IPV (Honeywell) | 34.7 | 14.0 | 14.5 | 26.4 |
| IPV (cup) | 40 | 45 | 48 | 56 |
| OPV | 0.016 | 0.02 | 0.02 | 0.04 |
| 140° heat seal (as is) | 320 | 342 | 433 | 283 |
| 140° heat seal (81% RH) | 77 | 178 | 208 | 170 |

Other samples are coated first with phosphate solution and dried, then coated with vinylidene chloride copolymer coating bath using techniques disclosed in application Ser. No. 367,343. Typical results are as follows:

|  | (a) | (b) | (c) | (d) |
|---|---|---|---|---|
| glycerine (%) | 5.3 | 5.9 | 6.0 | 6.0 |
| K coating thickness (mils) | 2.9 | 3.0 | 3.4 | 3.1 |
| IPV (Honeywell) | 7.0 | 0.8 | 0.5 | 3.8 |
| IPV (cup) | 0 | 0.11 | 28 | 1.0 |
| OPV | 0.03 | 0.02 | 0.02 | 4.5 |
| 140° heat seal (as is) | 27 | 47 | 61 | 10 |
| 140° heat seal (81% RH) | 72 | 82 | 72 | 108 |

EXAMPLE 3

If desired, an alkali silicate-impregnated gel cellophane film coated with phosphate solution with a vinylidene chloride copolymer coated thereover can be laminated to a tough, extensible film like polyethylene or polypropylene film. Polyethylene is better from the viewpoint of heat sealability and polypropylene is a better moisture barrier.

Such phosphate-coated cellophane films can be laminated to 2-mil polyethylene film for one-side lamination or 1-mil polyethylene for 2-side lamination. A suitable polyurethane adhesive (e.g., Morton Chem. Co. adhesive 76C333) can be dissolved in methyl ethyl ketone (1 to 3) and applied to the cellophane using a 2-mil doctor knife for the first coat and a 3-mil doctor knife for the second coat. The films are dried (e.g., with a heat gun) until tacky, then laminated by running through a nip roll laminator at 30 psi air pressure.

EXAMPLE 4

This example shows the use of ferric orthophosphate (following the procedures of application of Haskell & Hecht Ser. No. 316,271) on lithium silicate-impregnated gel cellophane film. The lithium silicate can be applied generally described hereinbefore to produce films impregnated with lithium silicate having a ratio of $SiO_2/Li_2O$ of about 3.5 with the percent of $Li_2O$ in bath analyses between about 0.33 and 0.66 and the percent of glycerine softener averaging 2.9% in the bath.

The $FePO_4$ recipe is as follows:

| | |
|---|---|
| $FeCl_3 \cdot 6H_2O$ | 106 g. |
| $H_3PO_4$ | 60 g. |
| ion exchange resin ("Rexyn 201") | 632 g. |
| methanol | dilute to 2000 ml. | the $FePO_4$-coated film is then given a vinylidene chloride copolymer coating as taught hereinbefore. The coating recipe is:

| | |
|---|---|
| $VCl_2$ polymer | 360 g. |
| Epon 1001 (75+) | 120 g. |
| Paraffin wax (Sunoco 4412) | 9 g. |
| Hydrite talc | 2.3 g. |
| $H_3PO_4$ | 3 g. |
| Toluene | 870 ml. |
| THF | 1650 ml. |

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

I claim:

1. In a shaped article comprising a water-sensitive regenerated cellulose substrate having coated on at least one surface thereof a moisture and oxygen barrier coating consisting essentially of aluminum orthophosphate, iron orthophosphate, or a vinylidene chloride copolymer applied from an organic solvent, the improvement wherein increased moisture and oxygen barrier properties can be obtained, which improvement consists in said substrate surface being first impregnated with about 0.15 to 1.5 g./m.$^2$ of an alkali metal silicate wherein the mole ratio of $SiO_2$ to alkali metal oxide is from about 1.6 to 4.6.

2. The article as defined in claim 1 wherein said alkali metal silicate is sodium silicate in an amount from about 0.3 to 1 g./m.$^2$.

3. The article as defined in claim 1 wherein said alkali metal silicate is lithium silicate in an amount from about 0.3 to 1 g./m.$^2$.

4. The article as defined in claim 1 wherein said barrier coating is a vinylidene chloride copolymer.

5. The article defined in claim 1 wherein the barrier coating contains aluminum orthophosphate with an aluminum to phosphorus ratio between 2.3 and 0.5.

6. The article defined in claim 5 wherein the barrier coating has a layer of vinylidene chloride copolymer thereover.

7. The article defined in claim 1 wherein the cellulosic substrate contains from about 5 to 12 percent of softener based on the total weight of the substrate.

8. The article defined in claim 1 wherein the mole ratio of $SiO_2$ to alkali metal oxides is from about 2.5 to 4.

9. In a process for applying a moisture and oxygen barrier coating consisting essentially of aluminum orthophosphate, iron orthophosphate, or a vinylidene chloride copolymer to at least one surface of a water-sensitive regenerated cellulose substrate, said barrier coating applied from an organic solvent, the improvement of increasing the moisture and oxygen barrier properties by first impregnating said surface with about 0.15 to 1.5 g./m.$^2$ of an alkali metal silicate wherein the mole ratio of $SiO_2$ to alkali metal oxide is from about 1.6 to 4.6.

10. The process as defined in claim 9 wherein said alkali metal silicate is sodium silicate in an amount from about 0.3 to 1 g./m.$^2$.

11. The process as defined in claim 9 wherein said alkali metal silicate is lithium silicate in an amount from about 0.3 to 1 g./m.$^2$.

12. The process as defined in claim 9 wherein said barrier coating is a vinylidene chloride copolymer.

13. The process defined in claim 9 wherein the barrier coating contains aluminum orthophosphate with an aluminum to phosphorus ratio between 2.3 and 0.5.

14. The process defined in claim 13 wherein the barrier coating has a layer of vinylidene chloride copolymer thereover.

15. The process defined in claim 9 wherein the cellulosic substrate contains from about 5 to 12 percent of softener based on the total weight of the substrate.

16. The process defined in claim 9 wherein the mole ratio of $SiO_2$ to alkali metal oxides is from about 2.5 to 4.

17. The process defined in claim 9 wherein the alkali metal silicate is applied to said film in an aqueous dispersion containing about 4 to 40 percent alkali metal silicate plus a softener.

18. The article as defined in claim 1 wherein the barrier coating contains iron orthophosphate with an iron to phosphorus ratio between 2.3 and 0.5.

19. The process as defined in claim 9 wherein the barrier coating contains an iron orthophosphate with an iron to phosphorus ratio between 2.3 and 0.5.

* * * * *